United States Patent
Tamas et al.

(10) Patent No.: US 9,313,087 B2
(45) Date of Patent: Apr. 12, 2016

(54) DISTRIBUTED COMPUTING ARCHITECTURE

(71) Applicant: STG Interactive S.A., Paris (FR)

(72) Inventors: Alexis Tamas, Paris (FR); Gregory Bellier, Sevres (FR)

(73) Assignee: STG Interactive, S.A., Paris (FR)

( * ) Notice: Subject to any disclaimer, the term of this patent is extended or adjusted under 35 U.S.C. 154(b) by 169 days.

(21) Appl. No.: 13/752,985

(22) Filed: Jan. 29, 2013

(65) Prior Publication Data

US 2014/0214996 A1    Jul. 31, 2014

(51) Int. Cl.
*H04L 12/24* (2006.01)
*G06F 9/50* (2006.01)

(52) U.S. Cl.
CPC .............. *H04L 41/00* (2013.01); *G06F 9/5038* (2013.01)

(58) Field of Classification Search
CPC ........................................................ H04L 41/00
USPC ................................................ 709/212, 226
See application file for complete search history.

(56) References Cited

U.S. PATENT DOCUMENTS

| | | | |
|---|---|---|---|
| 6,081,900 A | | 6/2000 | Subramaniam et al. |
| 7,062,556 B1* | | 6/2006 | Chen et al. .................... 709/226 |
| 7,401,112 B1 | | 7/2008 | Matz et al. |
| 2002/0120716 A1* | | 8/2002 | Raghunathan et al. ....... 709/219 |
| 2003/0195938 A1 | | 10/2003 | Howard et al. |
| 2005/0021836 A1 | | 1/2005 | Reed et al. |
| 2005/0091653 A1* | | 4/2005 | Willehadson et al. ........ 718/100 |
| 2009/0094436 A1 | | 4/2009 | Deng et al. |
| 2010/0146516 A1* | | 6/2010 | Yao ................................ 718/105 |
| 2011/0119399 A1 | | 5/2011 | Chen et al. |
| 2011/0270942 A1 | | 11/2011 | Archer et al. |
| 2012/0144031 A1 | | 6/2012 | Hu |
| 2014/0025828 A1* | | 1/2014 | Li et al. ......................... 709/226 |

FOREIGN PATENT DOCUMENTS

WO    WO 2012110079 A1 *    8/2012

OTHER PUBLICATIONS

Young, Designing a DMZ, SANS Institute, Mar. 26, 2001 (8 pgs).*
Pentakalos, An Introduction to the InfiniBand Architecture, O'Reilly Network, Feb. 4, 2002 (8 pgs).*
Windows Server Failover Clustering, www.availabilitydigest.com, Apr. 2010 (7 pgs).*

(Continued)

*Primary Examiner* — Wing F Chan
*Assistant Examiner* — Leon Y Tseng
(74) *Attorney, Agent, or Firm* — Harness, Dickey & Pierce, P.L.C.

(57) ABSTRACT

A system includes a plurality of servers and a border server. The border server receives a request for a transaction that can be accomplished by performing tasks, identifies a first task of the tasks, identifies an initial server of the servers to perform the first task by consulting, based on a type of the first task, routing data stored in memory of the border server, and requests that the initial server perform the first task. Each of the servers will, in response to receiving a task from the border server, perform the received task using related data stored exclusively on the server, determine whether the received task requires an additional task, identify a next server to perform the additional task by consulting routing data stored in memory of the server, and request that the next server perform the additional task.

26 Claims, 16 Drawing Sheets

(56) References Cited

OTHER PUBLICATIONS

A NewSQL Distributed Database for Transactional Big Data Applications; Clustrix; Apr. 2012; 2 pages.

Vandim Tkachenko et al.; Clustrix tpcc-mysql Benchmark; Percona Inc.; Oct. 2011; 25 pages.

Dan Kegel; The C1OK Problem; www.kegel.com/c10k.html; copyright 1999-2011; 20 pages.

Andrew Alexeev; The Architecture of Open Source Applications, vol. II: Structure, Scale, and a Few More Fearless Hacks, Nginx; www.aosabook.org/en/nginx.html; 2012; 13 pages.

Driving the New Wave of High Performance Applications, How NewSQL Delivers Speed, Scale, and Simplicity; Clustrix Regional Database Solution; 2012; 7 pages.

Scaling and the Sharding Deep Freeze; Clustrix; 2012; 7 pages.

Why Database Operations Hit the Wall; Clustrix; 2012; 5 pages.

Joe Williams; Apache vs Nginx: Web Server Performance Deathmatch; joeandmotorboat.com/2008/02/28/apache-vs-nginx-web-server-performance-deathmatch/; Feb. 28, 2008; 3 pages.

\* cited by examiner

DISTRIBUTED COMPUTING ARCHITECTURE

FIELD

The present invention relates to distributed computing and more particularly to processing and storage of data for scalable processing systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Computer systems have finite limits in terms of both storage capacity and processing capacity. When either or both of these capacities are reached, performance of the computer system suffers. To prevent or mitigate loss of performance, additional computing hardware may be added to increase the processing and/or storage capacities. This process is called scaling, and different types of workloads present different scaling challenges.

One approach to scaling is to parallelize computing processes among multiple computer systems, which then interact via a message passing interface (MPI). The MPI may allow parallel computing systems to coordinate processing to avoid conflicts between changes made by one system and changes made by another system. MPI has been implemented in a number of languages, including C, C++, and Fortran. The separate computing systems may be in separate physical enclosures and/or may be multiple processors within a single computer chassis or even multiple cores within a single processor. MPI may allow for high performance on massively parallel shared-memory machines and on clusters of heterogeneous distributed memory computers.

Another scaling approach uses distributed storage for structured query language (SQL) databases. However, transactional operations in distributed SQL databases are generally slowed because of the need to keep separate computers synchronized. Even when fast networks, such as INFINIBAND® protocol communication networks, are used, synchronization may impose limits on performance and scalability. Further, an additional limitation of the SQL database approach is that often data processing is not executed on the SQL database server but on another server. This increases latency because of the transportation of data from the SQL server to the computing server and back again to the SQL server.

Parallel processing is beneficial for large data sets, portions of which can be spread across different nodes and processed independently. However, transactional processing, where some or all transactions may depend on one or more previous transactions, is not as easily parallelized. For example, computers may synchronize access to a portion of data by locking the portion of data before processing of the transaction begins and unlocking the data upon successful completion of the transaction. While the data is locked, other computers cannot change the data, and in some instances cannot even read the data. As a result of the locking/unlocking process, there may be significant latency as well as significant variations in latency.

SUMMARY

A system includes a plurality of servers that each include a processor and memory, and a border server that includes a processor and memory. The border server (i) receives a request for a transaction, which can be accomplished by performing a plurality of tasks, (ii) identifies a first task of the plurality of tasks, (iii) identifies an initial server of the plurality of servers to perform the first task by consulting, based on a type of the first task, routing data stored in the memory of the border server, and (iv) requests that the initial server perform the first task. Each server of the plurality of servers is configured to, in response to receiving a request for a task from the border server, (i) perform the received task using data related to the received task that is stored exclusively on the server, (ii) determine whether the received task requires an additional task, (iii) identify a next server of the plurality of servers to perform the additional task by consulting, based on a type of the additional task, routing data stored in the memory of the server, (iv) request that the next server perform the additional task, and (v) in response to receiving a completion indication from the next server, respond to the border server with a completion indication corresponding to the received task.

In other features, the system includes a networking device configured to interconnect the plurality of servers with each other and with the border server. The border server (i) includes a first network port in communication with the networking device and a second network port not in communication with the networking device and (ii) receives the request for the transaction over the second network port. The border server is configured to receive the transaction request over the Internet through a web service.

In further features, the border server is configured to receive the transaction request from a web server. The web server serves a web page to a user and prepares the transaction request based on input provided by the user via the web page. The networking device includes an INFINIBAND® protocol communication network switch. The initial server and the next server are configured such that data is selectively transferred from the memory of the initial server to the memory of the next server via the networking device without involvement of the processor of the initial server or the processor of the next server. The plurality of servers each implement remote direct memory access (RDMA).

In other features, the system includes a mirror server that stores a copy of data stored by a designated server of the plurality of servers. The mirror server is configured to execute tasks in place of the designated server in response to a failure of the designated server. The plurality of servers collectively performs a plurality of types of tasks. The initial server is configured to perform a first type of task of the plurality of types of tasks, and the next server is configured to perform a second type of task of the plurality of types of tasks.

In further features, a first server of the plurality of servers is configured to perform the second type of task, a second server of the plurality of servers is also configured to perform the second type of task, the first server stores a first set of data related to the second type of task, the second server stores a second set of data related to the second type of task, and the first set of data is mutually exclusive with the second set of data. The routing data specifies the first server as the next server in response to the additional task corresponding to the first set of data. The routing data specifies the second server as the next server in response to the additional task corresponding to the second set of data.

In other features, the first server and the second server are configured to dynamically move data from the first set of data into the second set of data in response to over-utilization of the first server. In response to over-utilization of the initial server, (i) a first server of the plurality of servers is dynamically configured to also perform the first type of task, (ii) the data related to the received task stored by the initial server is split into a first set of data and a second set of data, (iii) the first set of data is mutually exclusive with the second set of data, and (iv) the second set of data is moved to the first server.

A system includes a plurality of servers each including a processor and memory. A first server of the plurality of servers is configured to (i) receive a request for a transaction, wherein the transaction can be accomplished by performing a plurality of tasks, (ii) select a first task of the plurality of tasks, (iii) identify a second server of the plurality of servers to perform the first task by consulting, based on a type of the first task, routing data stored in the memory of the first server, and (iv) request that the second server perform the first task. The second server is configured to, in response to receiving the request for the first task, (i) perform the first task using data stored exclusively on the second server, and (ii) determine whether the first task requires an additional task. The second server is configured to, in response to the first task requiring an additional task, (i) identify a third server of the plurality of servers to perform the additional task by consulting, based on a type of the additional task, routing data stored in the memory of the second server, (ii) request that the third server perform the additional task, and (iii) in response to receiving a completion indication from the third server, respond to the first server with a completion indication corresponding to the first task.

A system includes a border server and a plurality of servers, the border server includes a processor and memory, and each of the plurality of servers includes a processor and memory. A method of controlling the system includes, at the border server, receiving a request for a transaction. The transaction can be accomplished by performing a plurality of tasks. The method includes, at the border server, identifying a first task of the plurality of tasks. The method includes, at the border server, identifying an initial server of the plurality of servers to perform the first task by consulting, based on a type of the first task, routing data stored in the memory of the border server. The method includes, at the border server, requesting that the initial server perform the first task. The method includes, at a server of the plurality of servers, in response to receiving a request for a task from the border server, (i) performing the received task using data related to the received task that is stored exclusively on the server, (ii) determining whether the received task requires an additional task, (iii) identifying a next server of the plurality of servers to perform the additional task by consulting, based on a type of the additional task, routing data stored in the memory of the server, (iv) requesting that the next server perform the additional task, and (v) in response to receiving a completion indication from the next server, responding to the border server with a completion indication corresponding to the received task.

In other features, the method further includes receiving the transaction request, at the border server, over the Internet using a web service. The method further includes receiving the transaction request, at the border server, from a web server. The method further includes, at the web server, serving a web page to a user and preparing the transaction request based on input provided by the user via the web page. The method further includes selectively transferring data from the memory of the initial server to the memory of the next server without involvement of the processor of the initial server or the processor of the next server. The method further includes implementing remote direct memory access (RDMA) at each of the plurality of servers.

In further features, the method further includes, at a mirror server, storing a copy of data stored by a designated server of the plurality of servers, and at the mirror server, executing tasks in place of the designated server in response to a failure of the designated server. The method further includes collectively performing a plurality of types of tasks using the plurality of servers. The method further includes at, the initial server, performing a first type of task of the plurality of types of tasks, and at the next server, performing a second type of task of the plurality of types of tasks.

In other features, the method further includes, at a first server of the plurality of servers, performing the second type of task; at the first server, storing a first set of data related to the second type of task; at a second server of the plurality of servers, performing the second type of task; and at the second server, storing a second set of data related to the second type of task. The first set of data is mutually exclusive with the second set of data.

In further features, the routing data specifies the first server as the next server in response to the additional task corresponding to the first set of data. The routing data specifies the second server as the next server in response to the additional task corresponding to the second set of data. The method further includes dynamically moving data from the first set of data into the second set of data in response to over-utilization of the first server. The method further includes, at a first server of the plurality of servers, performing the first type of task, and, in response to over-utilization of the initial server, (i) splitting the data related to the received task into a first set of data and a second set of data, and (ii) moving the second set of data to the first server. The first set of data is mutually exclusive with the second set of data.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

In the drawings, reference numbers may be reused to identify similar and/or identical elements.

DETAILED DESCRIPTION

According to the principles of the present disclosure, transactional processing is scaled by splitting a transaction into multiple discrete tasks. Each of these tasks is assigned to a server, which executes the task and also stores data relevant to the task. In various implementations, a task is defined as a set of program instructions that are loaded exclusively in the local memory of a server and that will be executed only with resources local to the server (without any need of remote resources from other servers), in a limited execution time.

According to the dependencies between the tasks, some or all of the tasks may be processed in parallel, while others are processed serially. In various implementations, the assignment of the tasks between servers is dynamically adjusted to facilitate scaling. For example, in various implementations, a single server is capable of being assigned multiple tasks. At various times, one or more of these tasks can be split between that server and another server. The tasks are split between servers based on how the corresponding data can be partitioned. For example, if a task is performed with respect to the data of certain users, one server will perform the task with respect to a first group of users, and a second server will perform the task with respect to a second group of users. In various implementations, tasks can be split between as many servers as processing and storage capacities require, limited only by the ability to further partition the corresponding data.

Figure 1A:
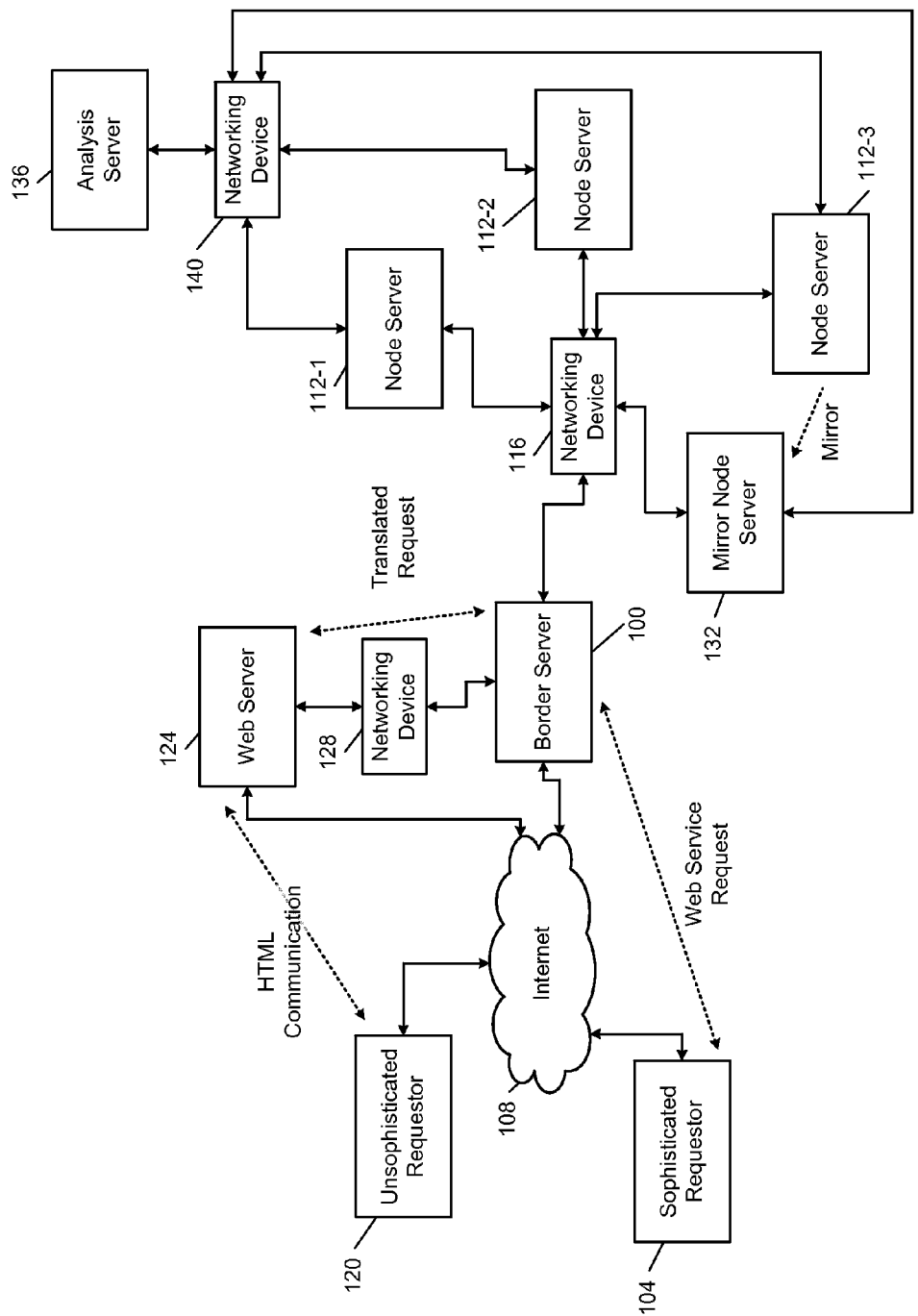
FIGS. 1A and 1B are high level functional block diagrams of example implementations of the principles of the present disclosure.

In FIG. 1A, a border server 100 receives a transaction request from a requestor 104 via a distributed communication system, such as the Internet 108. The border server 100 communicates with node servers 112-1, 112-2, and 112-3 (collectively, node servers 112) via a networking device 116. In various implementations, the networking device 116 may include a high speed switch, such as a gigabit or 10 Gb Ethernet switch, or an INFINIBAND® protocol communication network switch. The networking protocol used may, such as in the case of INFINIBAND® protocol communication networks, allow for remote direct memory access (RDMA), which allows data to be transferred between the node servers 112 with minimal interruption to processing occurring within the node servers 112.

Based on the transaction request, the border server 100 determines which tasks need to be performed in order to complete the transaction and sends task requests to one or more of the node servers 112. Once results of the tasks performed by the node servers 112 are returned to the border server 100, the border server 100 can send a response to the requestor 104. The response indicates success or failure of the transaction and may include additional data.

The requestor 104 is termed a sophisticated requestor when able to communicate directly with the border server 100. In one example, the sophisticated requestor 104 interacts with the border server 100 using a web service, such as the simple object access protocol (SOAP), which relies on extensible markup language (XML).

Another requestor 120 is termed unsophisticated because the requestor 120 communicates with a web server 124 instead of directly with the border server 100. In various implementations, the requestor 120 communicates with the web server 124 using standard web protocols, such as hypertext markup language (HTML) and hypertext transferred protocol (HTTP). For example only, the web server 124 may execute web server software such as NGINX.

The web server 124 serves web pages relating to the services offered by the border server 100 and receives data and requests from the requestor 120 and provide responses to the requestor 120. Based on data received from the requestor 120, the web server 124 generates a transaction request, which is transmitted to the border server 100. The border server 100 then processes the transaction request similarly to one received directly. In various implementations, the web server 124 and the border server 100 communicate via a networking device 128, which may include a firewall.

One or more mirror servers may be used to increase availability—that is, the mirror server is capable of taking the place of a failed server, eliminating or mitigating the impact of failed hardware. In FIG. 1A, a mirror node server 132 is shown to be mirroring the node server 112-3. In this implementation, if the node server 112-3 experiences a software or hardware fault, task processing is taken over by the mirror node server 132. To accomplish this, the mirror node server 132 processes tasks in parallel with node server 112-3 to maintain equivalent state. Additionally or alternatively, the mirror node server 132 repeatedly retrieves state data from node server 112-3, either continuously or at short intervals.

In various implementations, an analysis server 136 processes data from the node servers 112. For example, this data includes log data indicating performance of the node servers 112 and/or substantive data, such as the outcome of transactions. In implementations where the analysis server 136 is not operating in real-time, the analysis server 136 is connected to the node servers 112 (as well as the mirror node server 132) via a networking device 140. The networking device 140 may have restricted bandwidth and/or functionality when compared to the networking device 116.

Figure 1B:
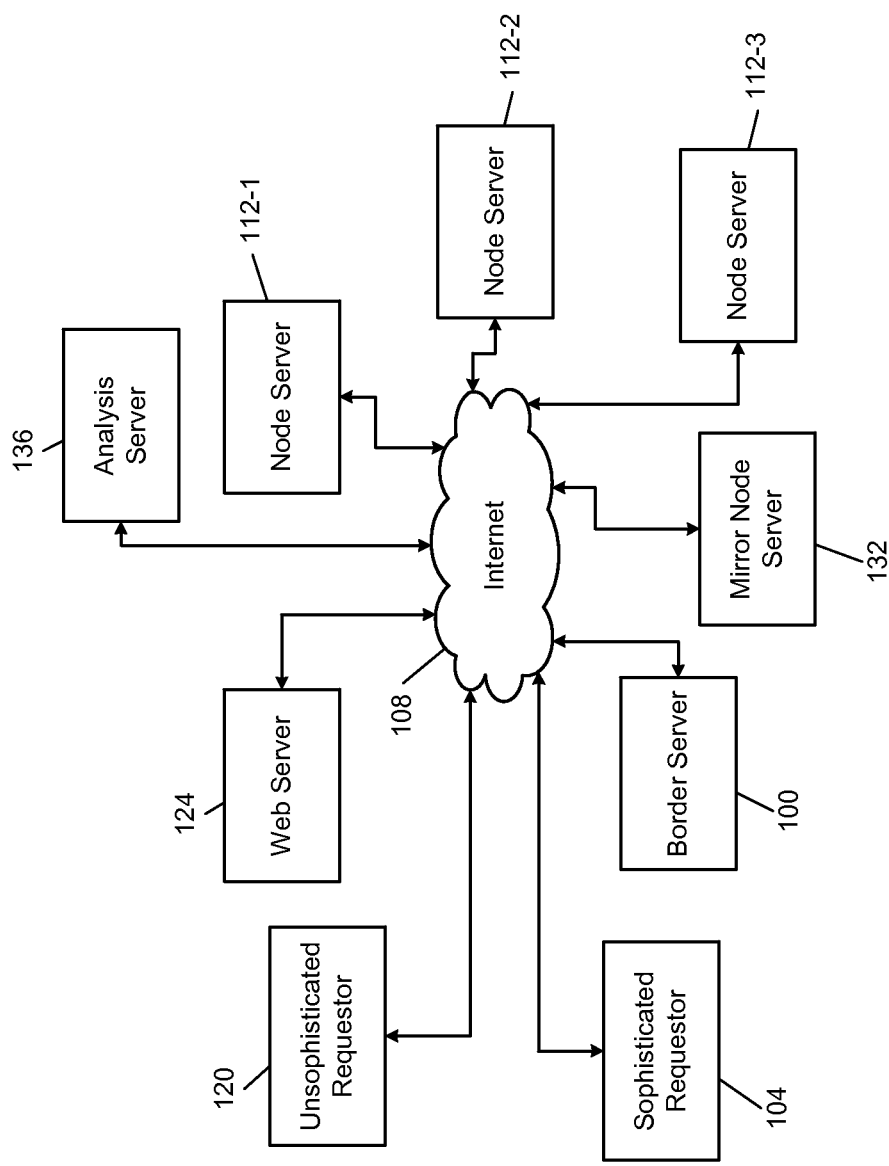

The various devices depicted in FIG. 1A, such as the node servers 112, the border server 100, and the web server 124 may be collocated at a facility. In various other implementations, one or more of these devices may be connected across a distributed communication system, such as the Internet 108. Although the same reference numerals are used in FIGS. 1A and 1B, the devices in FIG. 1B may be modified to operate across the Internet 108.

Figure 2A:
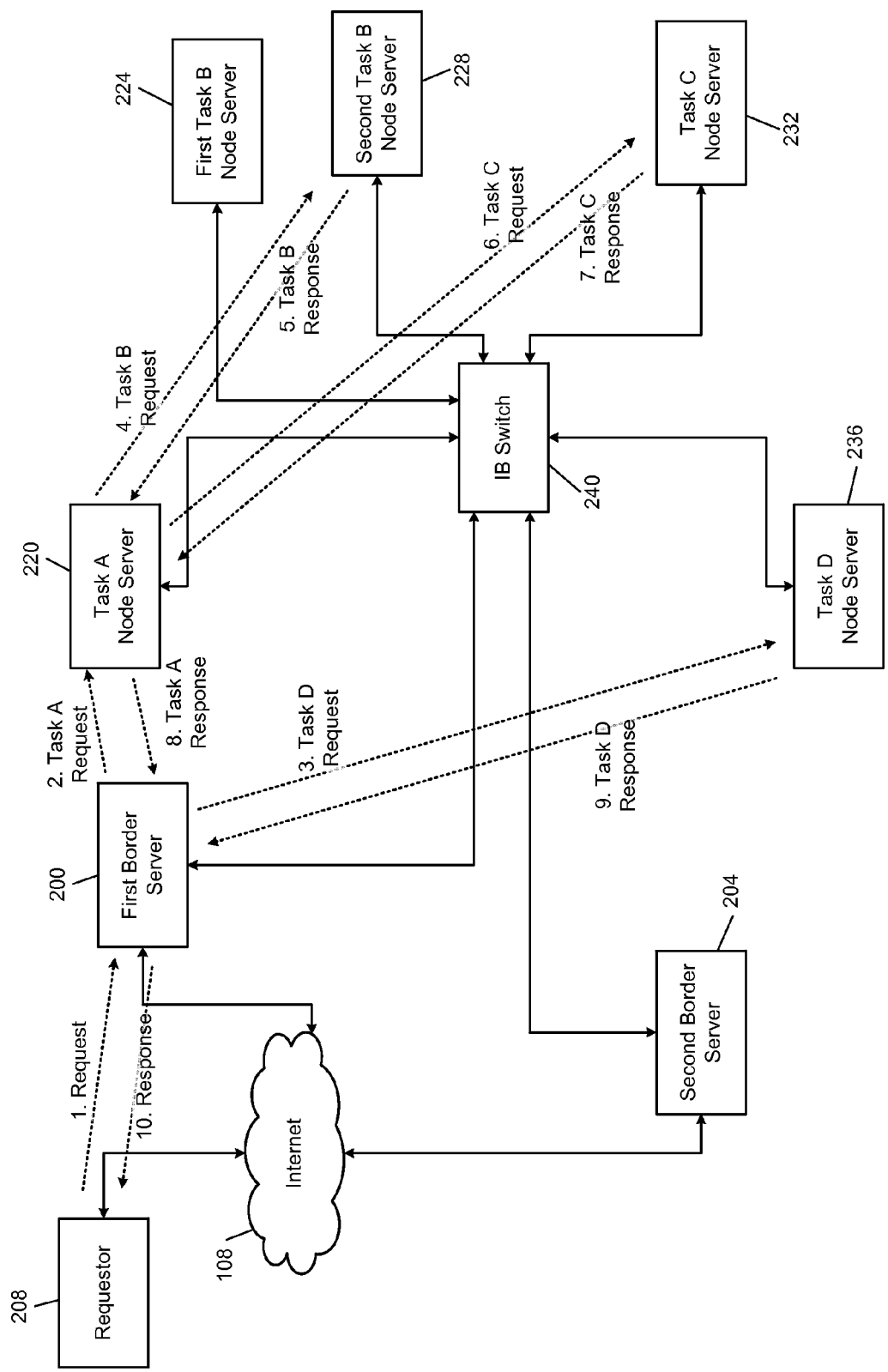
FIG. 2A is a high level functional block diagram of tasks assigned to servers.

In FIG. 2A, a first border server 200 and a second border server 204 are both shown. A requestor 208 sends a request to either the first border server 200 or the second border server 204 via the Internet 108. The second border server 204 may be used to augment the processing and storage capacities of the first border server 200. Alternatively, the first border server 200 and the second border server 204 may process different types of transaction requests and/or may include permissions that will only allow interaction with different sets of users.

In FIG. 2A, a simplified example of a transaction request, with associated illustrative tasks, is shown. First, the requestor 208 sends a transaction request to the first border server 200. This is labeled in FIGS. 2A and 2B with a numeral '1'. The first border server 200 communicates with a node server 220, a node server 224, a node server 228, a node server 232, and a node server 236 via an INFINIBAND® protocol communication network switch 240. Based on processing and storage needs, the node servers have been balanced according to the example shown in FIG. 2A, where the node server 220 is assigned to perform task A, the node servers 224 and 228 are assigned to perform task B, the node server is assigned to perform task C, and the node server 236 is assigned to perform task D. As mentioned above, the node servers 224 and 228 both execute task B, but with respect to non-overlapping sets of data.

Figure 2B:
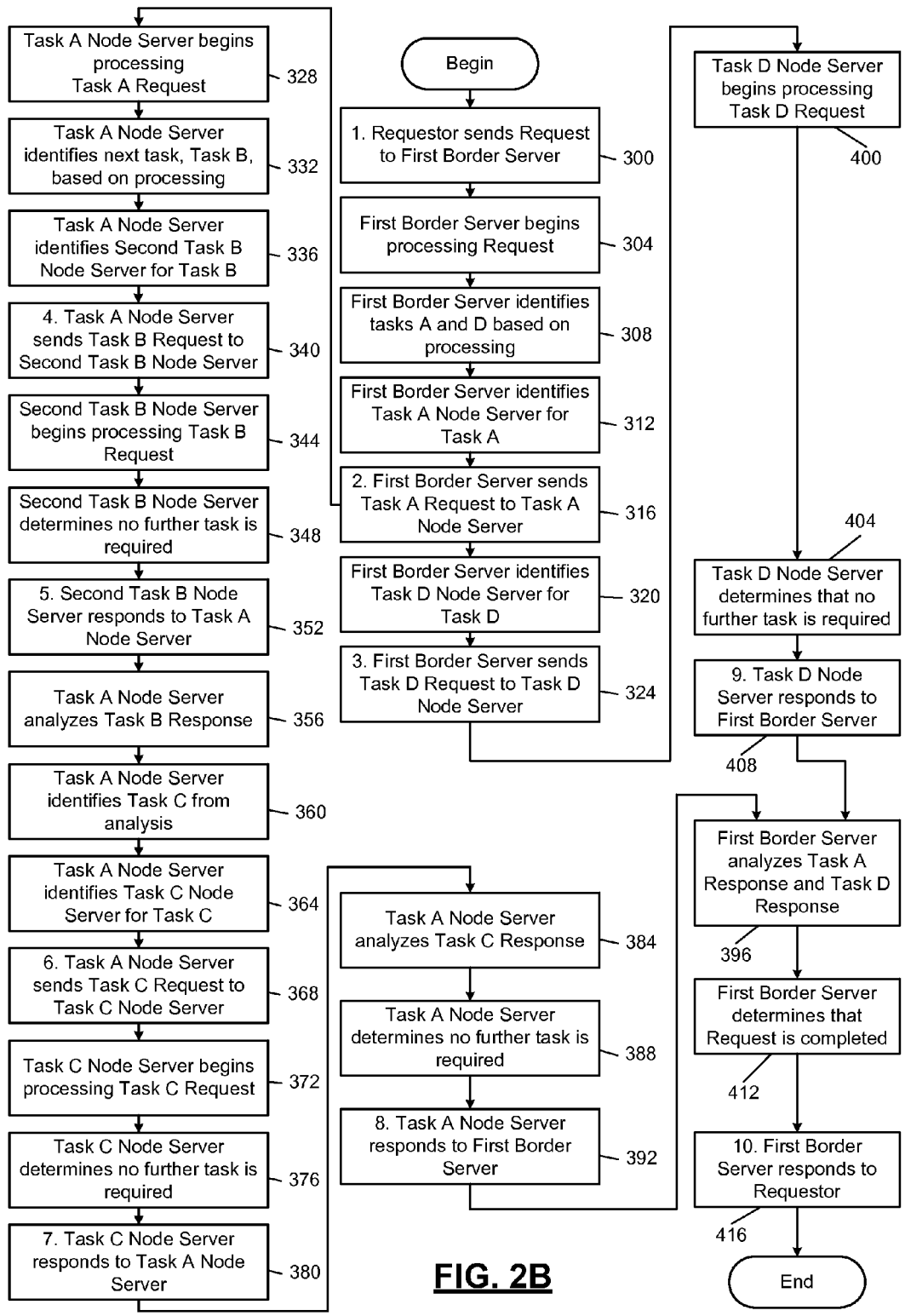
FIG. 2B is a flowchart describing operation of the blocks of FIG. 2A.

FIG. 2B describes the simplified messaging depicted in FIG. 2A. Control begins at 300, where the requestor 208 sends a transaction request to the first border server 200. At 304, the first border server 200 begins processing the request and at 308 identifies that tasks A and D need to be performed based on the transaction request. At 312, the first border server 200 identifies node server 220 as the appropriate node server for performing task A and at 316, the first border server 200 sends a request for task A (number 2) to the node server 220. At 320, the first border server 200 identifies the node server 236 as the appropriate node server for task D and at 324 sends a request for task D (number 3) to the node server 236.

At 328, the node server 220 begins processing the request for task A and at 332 identifies an additional task, task B, needed in order to finish task A. At 336, the node server 220 identifies node server 228 as the correct server for performing task B for this particular transaction request. At 340, the node server 220 sends a request for task B (number 4) to the node server 228. At 344, the node server 228 begins processing the task B request and at 348 determines that no additional tasks are needed and so the node server 228 responds (number 5) to the node server 220 at 352.

At 356, the node server 220 analyzes the response from task B and at 360, determines that a further task, task C, is required before completion of task A. At 364, the node server 220 determines that the node server 232 is the appropriate node server for performing task C and therefore sends a request for task C (number 6) to the node server 232 at 368. At 372, the node server 232 begins processing the task C request, at 376 determines that no further task is required, and at 380 responds to the node server 220 (number 7).

At 384, the node server 220 analyzes the response from the node server 232 and at 388 determines that no further task is required. At 392, the node server 220 responds to the first border server 200 (number 8) and control transfers to the 396. Meanwhile, at 400, which begins in parallel with 328, the node server 236 begins processing the task D request. Shown for illustration only, a long line between 400 and 404 visually represents that the task D processing required a significant amount of time. At 404, the node server 236 determines that no further task is required and at 408, the node server 236 responds to the first border server 200 with the task D response (number 9). Control then continues at 396.

At 396, the first border server 200 has now received both the response for task A and the response for task D. If task A and task D had not been performed in parallel, the first border server 200 would have had to wait significantly longer for both tasks to be performed serially. At 412, the first border server 200 determines that the transaction request has been completed. At 416, the first border server 200 sends a transaction response (number 10) to the requestor 208. Processing of this transaction is now complete.

Figure 2C:
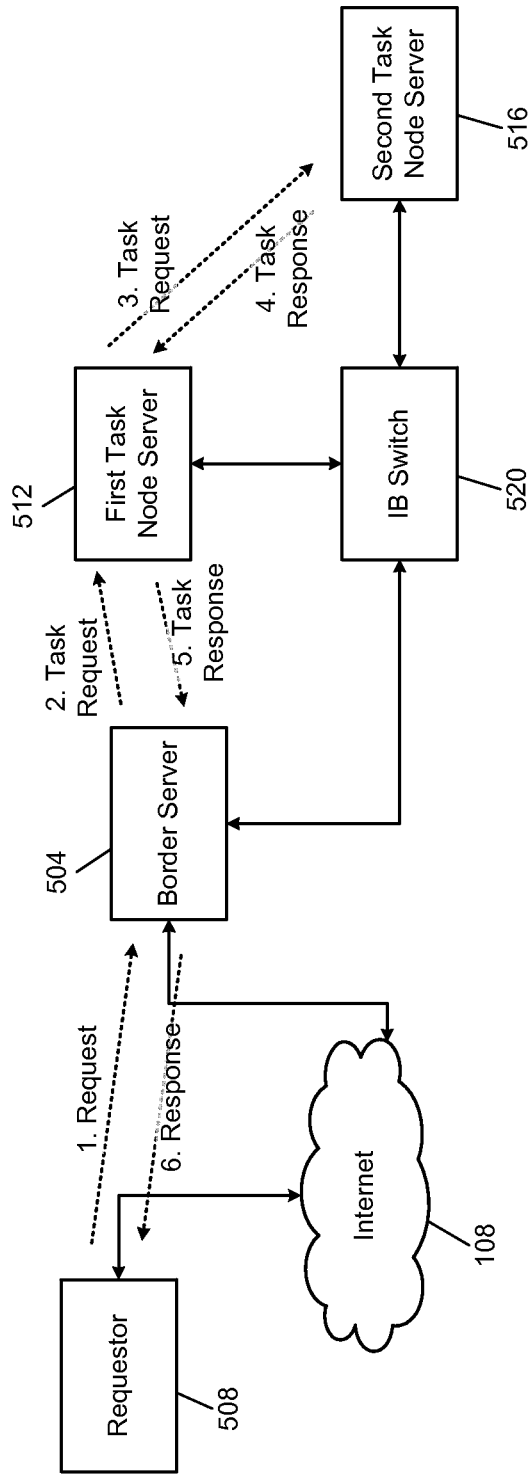
FIG. 2C is a high level functional block diagram of tasks assigned to specific servers based on an example transaction.

In FIG. 2C, an arrangement for a simpler transaction is shown. A border server 504 communicates with a requestor 508 via the Internet 108. The border server 504 communicates with a node server 512 and a node server 516 via an INFINIBAND® protocol communication network switch 520.

Figure 2D:
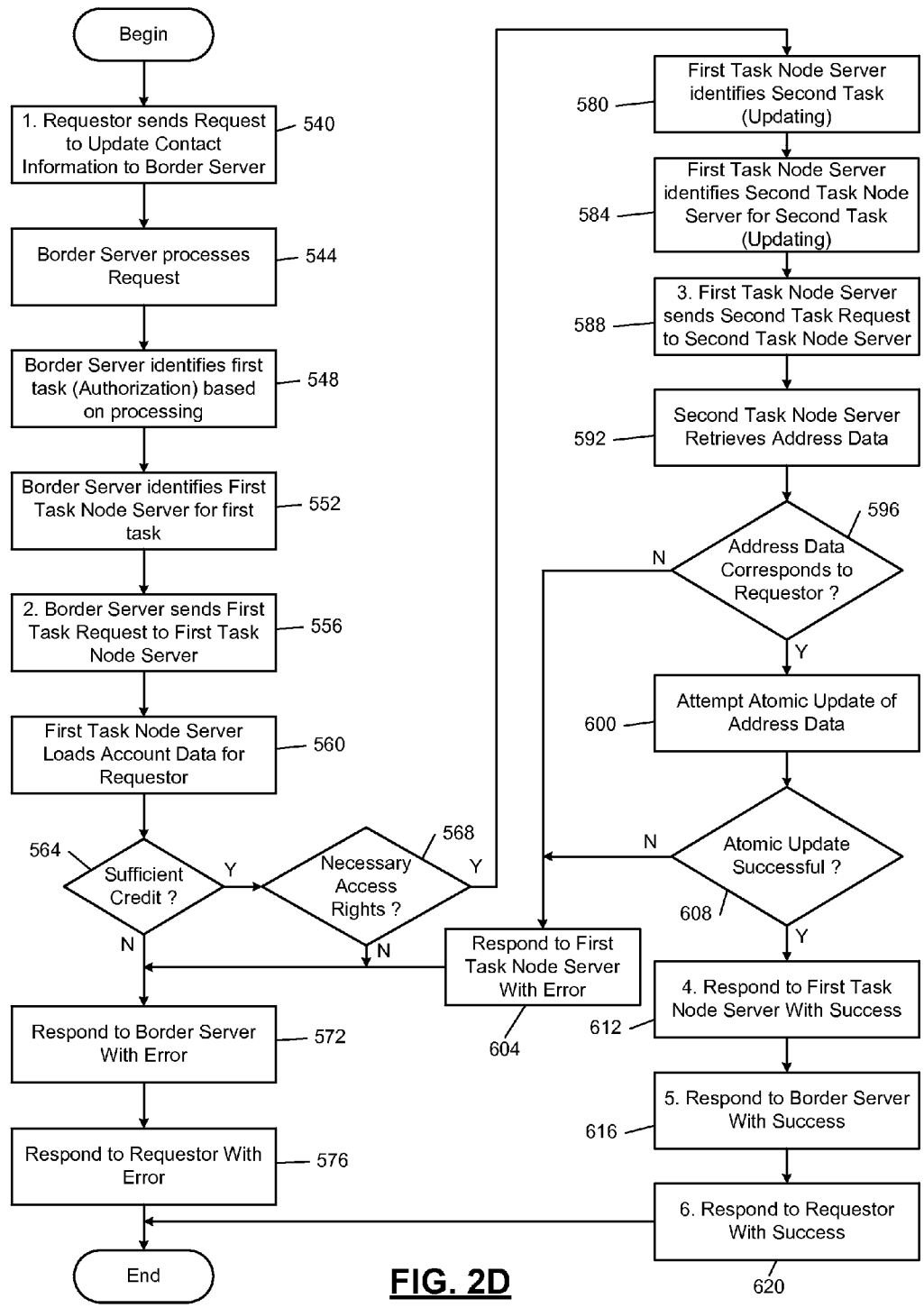
FIG. 2D is a flowchart depicting operation of the servers of FIG. 2C in processing the example transaction.

FIG. 2D describes the messages exchanged in the illustration of FIG. 2C. Control begins at 540, where the requestor 508 sends a transaction request to the border server 504 (number 1). The transaction request is a request to update contact information corresponding to a certain user. At 544, the border server 504 receives the request and at 548 the border server 504 identifies a first task to be performed in response to the transaction request. For example only, the first task is authorization, which ensures that the requestor is authorized to update the contact information.

At 552, the border server 504 identifies the node server 512 as the appropriate server to perform the first task. At 556, the border server 504 sends a first task request (number 2) to the node server 512. At 560, the node server 512 loads account data corresponding to the requestor 508. Control continues at 564, where control determines whether the requestor 508 has sufficient credit to perform the contact modification.

For example, the credit can be a monetary balance, where each update has an associated fee. Additionally or alternatively, the credit may represent a count, such as a monthly credit used to limit the number of updates that can be made per month. If there is sufficient credit, control transfers to 568; otherwise, control transfers to 572. At 572, the node server 512 responds to the border server 504 with an error, and the border server 504 responds to the requestor 508 notifying the requestor 508 of the error. After responding to the requestor 508 at 576, control ends.

Returning to 568, control determines whether the requestor 508 has the necessary access rights. If so, control transfers to 580; otherwise, control transfers to 572. At 580, the requestor 508 has been authorized and therefore the node server 512 identifies a second task to be performed. At 584, node server 512 identifies the node server 516 as the appropriate server for the second task, which may be the actual updating of contact information.

At 588, the node server 512 sends a second task request (number 3) to the node server 516. At 592, the node server 516 retrieves address data from storage local to the node server 516. At 596, control determines whether the address corresponds to the requestor 508 and, if so, control continues at 600; otherwise, control transfers to 604.

At 600, control attempts an atomic update of the address data. In other words, control attempts to read the address data, change the address data, and write the address data back without interference from any other process. If the atomic update is successful at 608, control continues at 612. If the atomic update is unsuccessful, the address data is left unchanged and control transfers to 604. At 604, the node server 516 responds to the node server 512 with an error indication and control continues at 572. In various implementations, the node server 516 may also inform the border server 504 directly of the error.

At 612, the node server 516 responds to the node server 512 with a task response (number 4) indicating success. At 616, the node server 512 responds to the border server 504 with a task response (number 5) indicating success. At 620, the border server 504 sends a transaction response (number 6) to the requestor 508.

Figure 3:
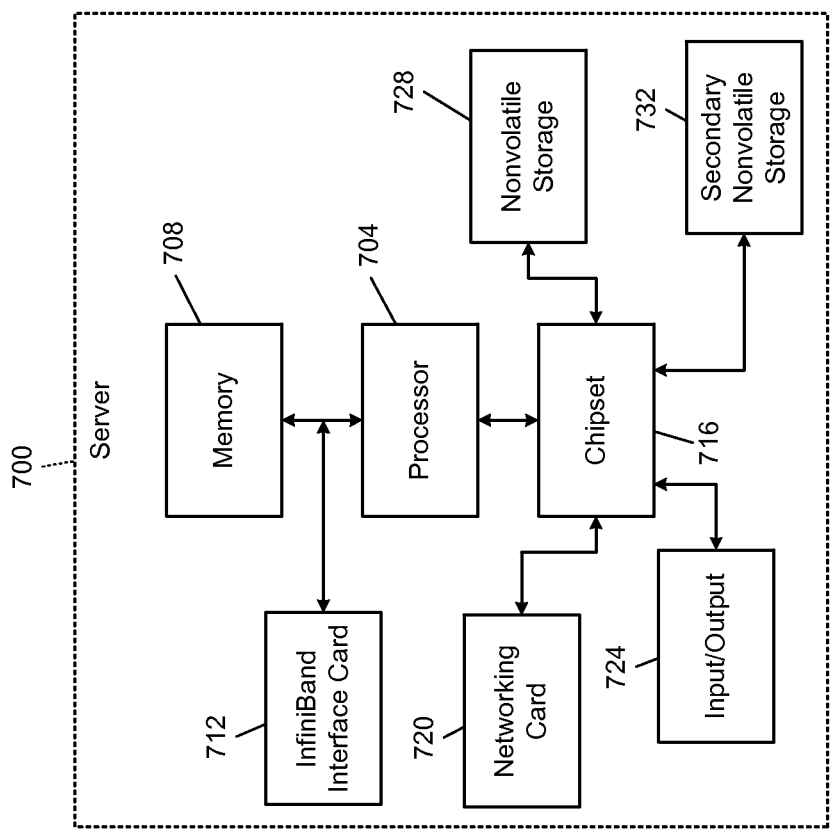
FIG. 3 is a simplified block diagram of an example implementation of one of the servers.

FIG. 3 shows an example implementation of a server 700 including a processor 704 and memory 708. The processor 704 may execute instructions from the memory 708, and may read and write data stored in the memory 708. The depiction in FIG. 3 is simplified—for example, the processor 704 may itself include memory, called cache, which may store instructions, data, or both.

An INFINIBAND® protocol communication network interface card 712 allows the server 700 to interact with other INFINIBAND® protocol communication network devices. The INFINIBAND® protocol communication network interface card 712 is shown schematically as connected to the front-side bus between the processor 704 and the memory 708, because the INFINIBAND® protocol communication network interface card 712 may be capable of directly transferring data to and from the memory 708 without oversight by the processor 704.

A chipset 716, which may include one or more chips, or may be integrated with the processor 704 on a single die or in a single package, provides communication between the processor 704 and peripherals. For example, the processor 704 may communicate with other networking devices via a networking card 720. The processor 704 may receive user input, such as keyboard and mouse input, and may output data to a user, such as via a display, from input/output device 724.

Nonvolatile storage 728 may store instructions that are read into memory 708 for execution by the processor 704 and may store data relating to various tasks. Nonvolatile storage 728 may include flash memory. Secondary nonvolatile storage 732 may have greater capacity than nonvolatile storage 728 but have a lower throughput and/or a higher latency. The secondary nonvolatile storage 732 may include magnetic storage, including hard drives and tape. The nonvolatile storage 728 may store frequently-used information, such as operating system data, separately from the secondary nonvolatile storage 732. Additionally or alternatively, nonvolatile storage 728 may serve as a cache for the secondary nonvolatile storage 732.

Figure 4:
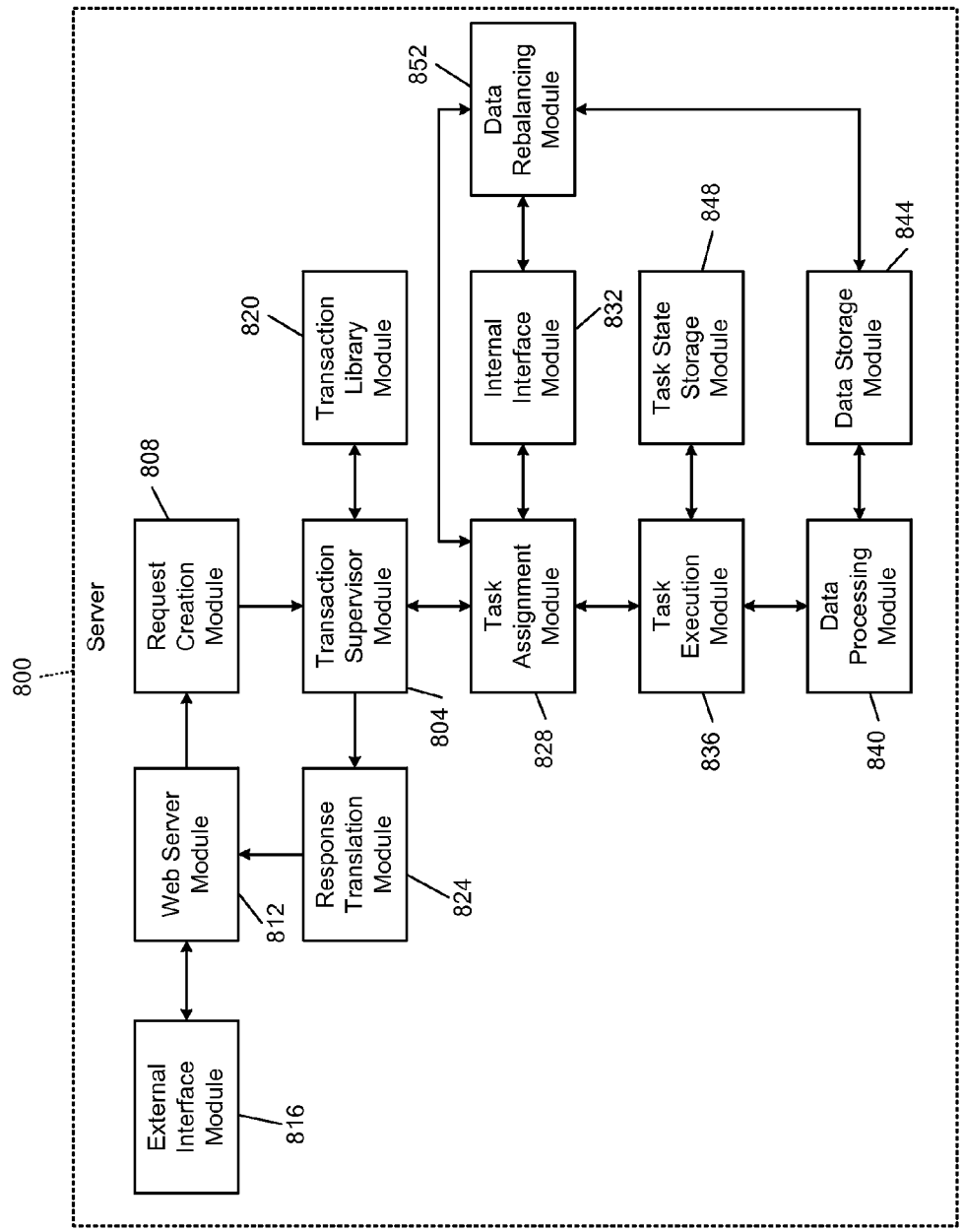
FIG. 4 is a functional block diagram of an example implementation of one of the servers.

FIG. 4 shows an example implementation of functional blocks implemented on a server 800. For example only, each of the functional blocks depicted in the server 800 may be implemented by specially programming the server 700 such that instructions corresponding to each block of the server 800 are stored in the memory 708 and executed by the processor 704 of FIG. 3. The server 800 as depicted includes functional blocks relating to a border server, a node server, and a web server.

A transaction supervisor module 804 receives a transaction request from a request creation module 808. The request creation module 808 receives data from a web server module 812 and creates the transaction request based on that data.

An external interface module 816 communicates with a requestor, such as via a network interface. In implementations where a sophisticated requestor does not require a web server, the transaction supervisor module 804 may communicate directly with the external interface module 816. The transaction supervisor module 804 determines subsidiary tasks corresponding to a received transaction request. The subsidiary tasks corresponding to each type of transaction may be stored by a transaction library module 820.

For example only, the transaction library module 820 may include a database or other data structure having an entry for each type of transaction request. The entry may include a pointer, reference, or database relation to a list of corresponding tasks. The entry may also include an order in which to serially execute the tasks and/or a data structure indicating which precursor tasks must be executed before executing a selected task.

When the tasks are complete, the transaction supervisor module 804 responds using a response translation module 824 and the response translation module 842 may translate a response into a format suitable for display by the web server module 812. Based on the subsidiary tasks, the transaction supervisor module 804 identifies which node server to assign each task to using a task assignment module 828. The task assignment module 828 may store mappings between tasks and the associated servers, including which server corresponds to each set of data when multiple servers correspond to a single task.

For example only, the task assignment module 828 may include a database or other data structure that includes an entry for each task, that entry specifying the corresponding node server. For tasks performed by multiple node servers, additional information may be stored in that entry, or in a separate location referenced by that entry, specifying which data set corresponds to which node server.

Task requests are sent to other servers via an internal interface module 832, which may communicate with an internal network, such as an INFINIBAND® protocol communication network. A task execution module 836 is responsible for executing the task, which may include accessing or modifying a database using a data processing module 840. The data processing module 840 may rely on data stored in a data storage module 844. The task execution module 836 may track which tasks are in progress and which tasks are awaiting responses based on further tasks. This information may be stored by a task state storage module 848.

A data rebalancing module 852 is configured to determine when the server 800 is nearing a capacity of either processing or storage. The data rebalancing module 852 may then coordinate with other servers via the internal interface module 832 to reassign tasks. The reassigned tasks trigger an update in the task assignment module 828 so that tasks can be routed to the appropriate servers. In addition, when tasks are reassigned, the corresponding data is reassigned to the appropriate server. Therefore the data rebalancing module 852 will also update the data storage module 844. In various implementations, servers may be rebalanced even while tasks are pending. In such cases, the data rebalancing module 852 may also update the task state storage module 848.

Figure 5:
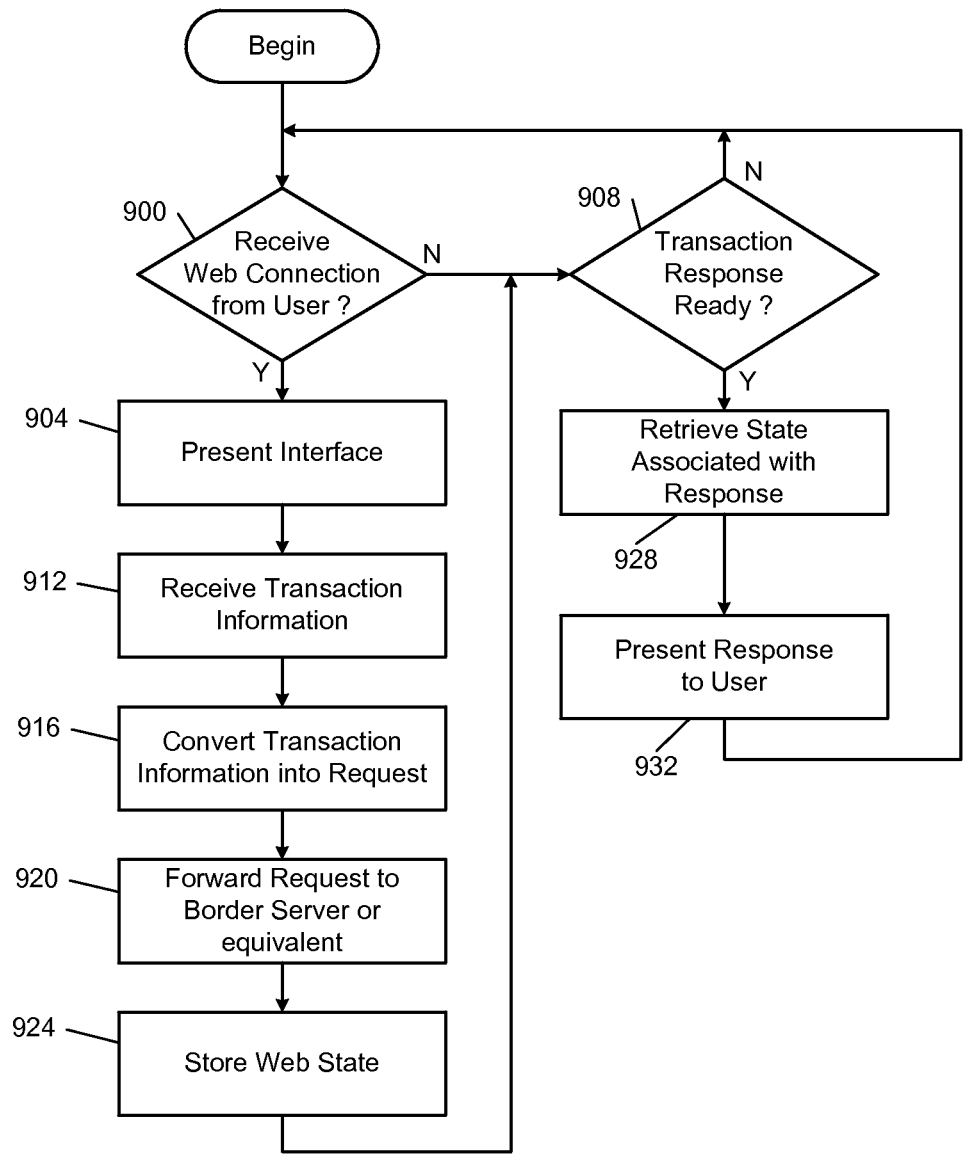
FIG. 5 is a flowchart depicting example operation of web server functionality.

Referring now to FIG. 5, an example method of providing web connectivity begins at 900. If a web connection is received from a user, control transfers to 904; otherwise, control transfers to 908. At 904, the web server presents a user interface to the user, such as by using HTML via HTTP. At 912, control receives transaction information from the user and at 916 the information is converted into a transaction request. At 920, the request is forwarded to a border server or another server implementing border functionality.

Control continues at 924, where web state is stored. The web state may include information necessary to maintain or resume the connection, such as Internet protocol (IP) address, port, and transmission control protocol (TCP) sequence number. In addition, the web state may store data relating to transaction requests that have been made and are still in progress. Control then continues at 908.

At 908, control determines whether a response to any of the pending transactions is ready. If so, control transfers to 928; otherwise, control returns to 900. At 928, control retrieves the state associated with the received transaction response and continues at 932. At 932, based on the retrieved state, control establishes a connection with the user and presents the response to the user, such as through a web page. In various implementations, control does not instantiate a process for each web connection made. Instead, state information is stored in a repository, such as a database, so that the connection can remain inactive for relatively long periods of time and the state information can be later looked up from the data store. In this way, a larger number of outstanding transactions may be handled by a single web server. For purposes of illustration only, a web server according to these principles may allow for 100,000 simultaneous connections on given hardware, while conventional servers may be limited to 1,000 connections on that same hardware.

Figure 6A:
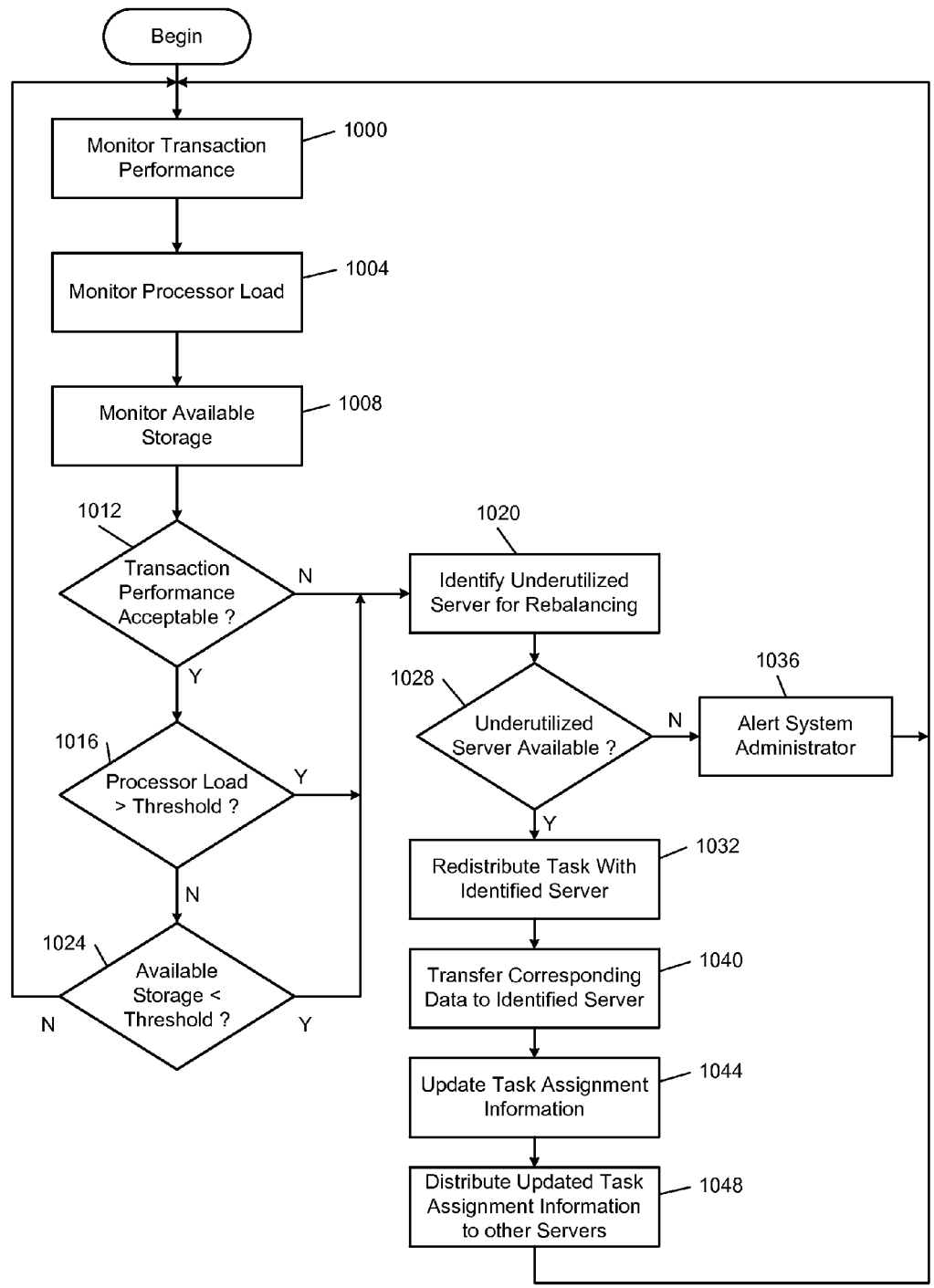
FIG. 6A is a high level flowchart of example rebalancing operation.

In FIG. 6A, a high level example of rebalancing tasks between nodes begins at 1000 where transaction performance of a given server is monitored. For example, the time required to complete a transaction as well as statistical variance in transaction completion times may be monitored. At 1004, processor loading is monitored. For example only, processor loading may include an average processor utilization or a percentage of time the processor spends at 100 percent utilization.

At 1008, available storage is monitored. Control continues at 1012, where if transaction performance is acceptable, control continues at 1016; otherwise, control transfers to 1020. At 1016, control determines whether the processor load is greater than a threshold. If so, control transfers to 1020; otherwise, control transfers to 1024. At 1024, control determines whether the available storage is less than a threshold. If so, control transfers at 1020; otherwise, control returns to 1000.

At 1020, control identifies an underutilized server for rebalancing purposes. A server may be considered underutilized if its transaction performance, processor load, and available storage are within predetermined bounds. If, at 1028, an underutilized server is available, control continues at 1032; otherwise, control alerts a system administrator to a lack of resources at 1036 and control returns to 1000.

At 1032, control redistributes a task with the identified underutilized server. In various implementations, the entire task may be assigned to the identified server, while in other implementations and/or other situations, one or more tasks may be split between the server and the identified server. At 1040, data corresponding to the transferred task is also transferred to the identified server. At 1044, task assignment information is updated to reflect the rebalancing of tasks. At 1048, the updated task assignment information is distributed to other servers.

Figure 6B:
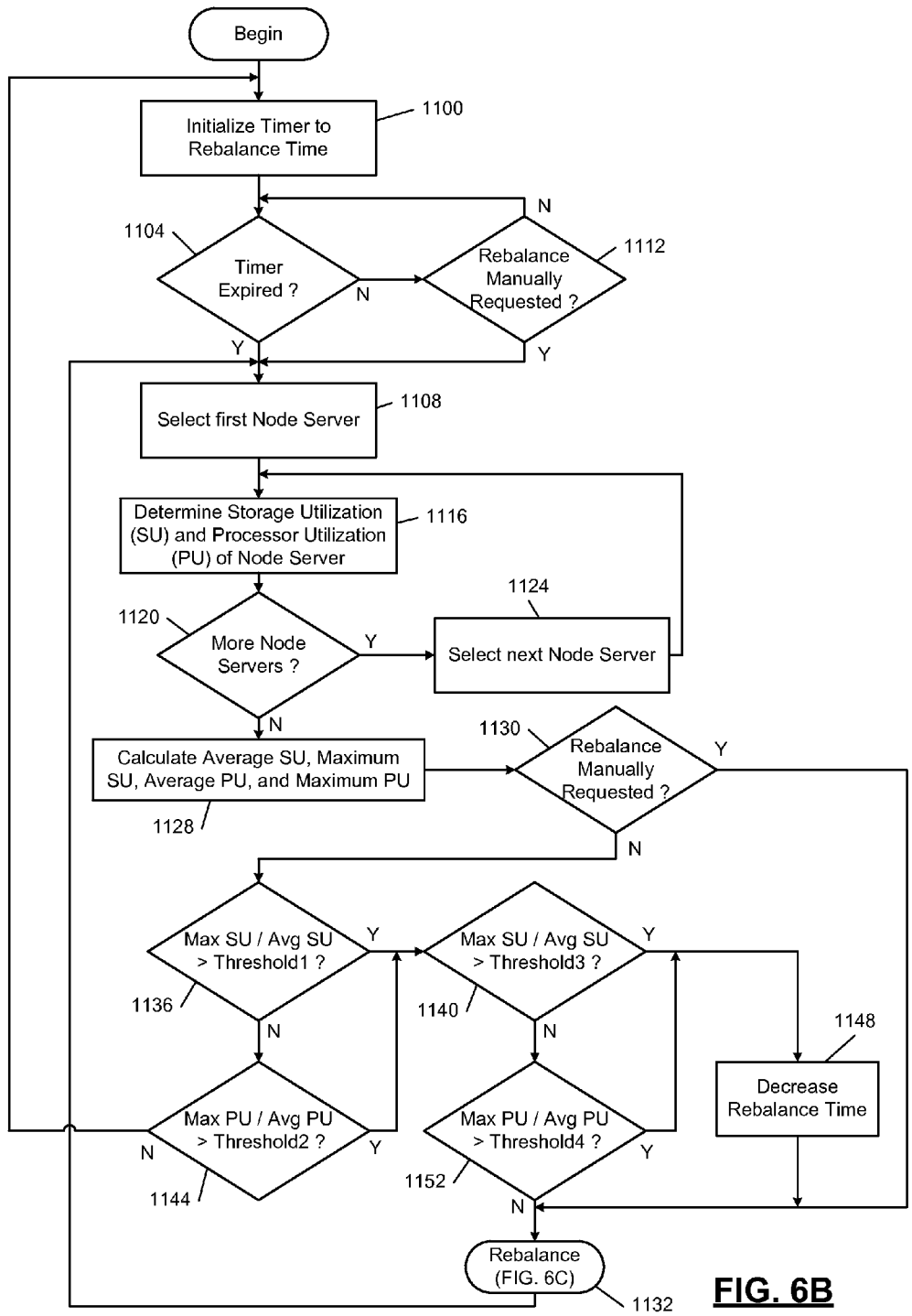
FIG. 6B is a flowchart depicting an example method of determining when rebalancing is to be performed.

In FIG. 6B, a system-wide process for determining whether to rebalance begins at 1100, where a timer is initialized. The timer may be initialized to a predetermined value, called a rebalance time. The rebalance time determines how often control evaluates whether a rebalance is necessary. At 1104, if the timer has expired, control transfers to 1108; otherwise, control transfers to 1112. At 1112, if a rebalance has been manually requested, such as by an administrator, control transfers to 1108; otherwise, control returns to 1104. At 1108, a first node server is selected and control continues at 1116.

At 1116, control determines storage utilization (SU) and processor utilization (PU) of the selected node server. At 1120, control determines whether there are additional node servers to analyze. If so, control transfers to 1124, where the next node server is selected and control continues at 1116; otherwise, control transfers to 1128. At 1128, control calculates the average SU across the node servers, the maximum SU, the average PU across the node servers, and the maximum PU.

Control continues at 1132, where if a rebalance has been manually requested, control transfers to 1132; otherwise, control transfers to 1136. At 1136, if the maximum SU divided by the average SU is greater than a first threshold, control transfers to 1140; otherwise, control transfers to 1144. At 1144, if the maximum PU divided by the average PU is greater than a second threshold, control transfers to 1140; otherwise, control returns to 1100. At 1140, a rebalance will be performed based on either the maximum SU being considerably higher than the average SU or based on the maximum PU being considerably higher than the average PU.

Figure 6C:
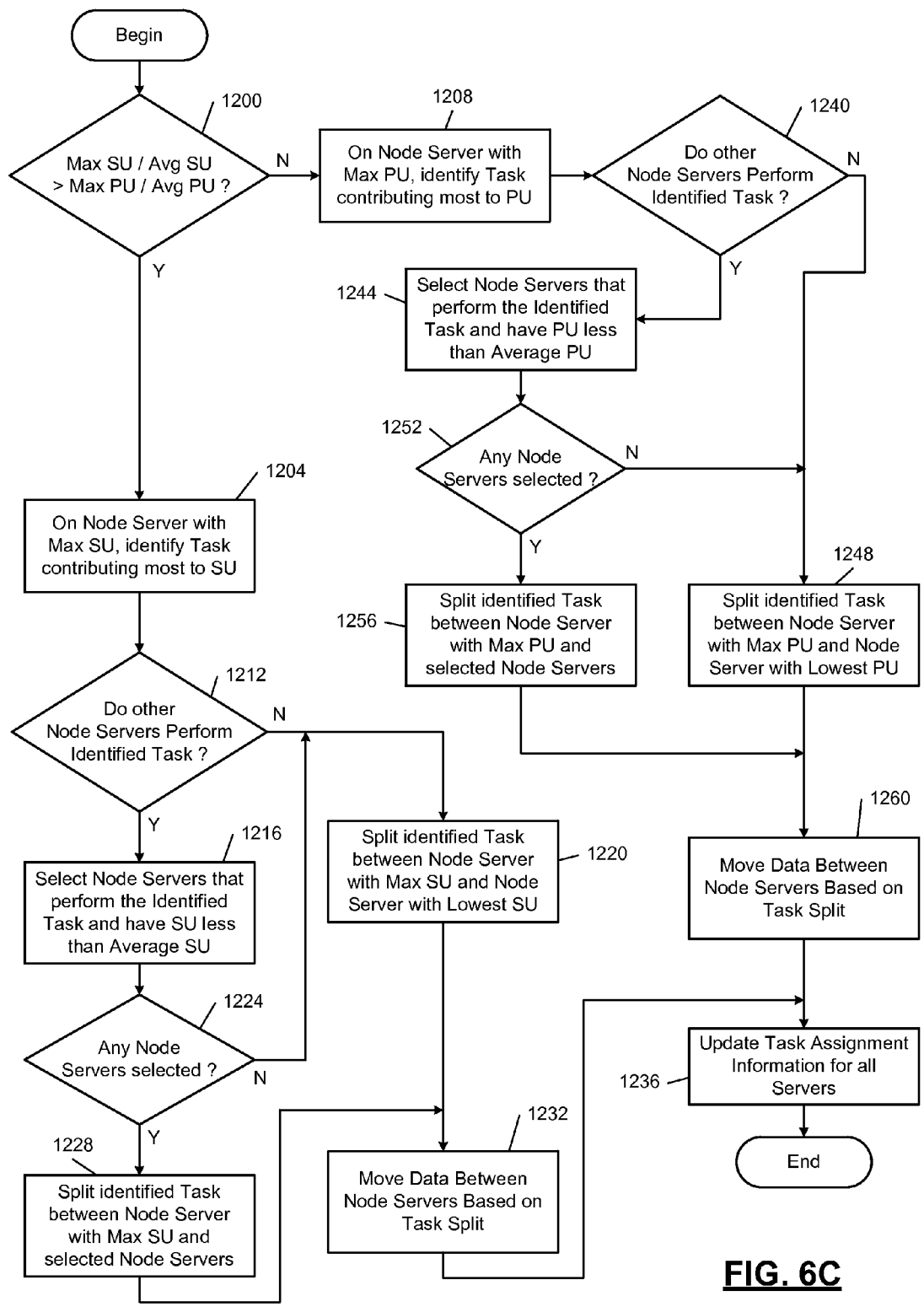
FIG. 6C is a flowchart of example rebalancing operation.

At 1140, control determines if the difference between maximum and average utilizations was so great that the rebalance time should be reduced. Therefore, if the maximum SU divided by the average SU is greater than a third threshold (the third threshold being even greater than the first threshold), control transfers to 1148 to decrease the rebalance time; otherwise, control transfers to 1152. If the maximum PU divided by the average PU is greater than a fourth threshold (the fourth threshold being even greater than the second threshold), control transfers to 1148; otherwise, control transfers to 1132, where the servers are rebalanced, such as is shown in FIG. 6C. At 1148, the rebalance time is decreased and control continues at 1132.

In FIG. 6C, an example rebalancing process begins at 1200. At 1200, control determines whether PU or SU is more imbalanced. If maximum SU divided by average SU is greater than maximum PU divided by average PU, control transfers to 1204; otherwise, control transfers to 1208. At 1204, the SU has been determined to be more imbalanced than the PU and so, for the node server with the maximum SU, the task contributing most to the SU is identified.

At 1212, if other node servers are performing the identified task, control transfers to 1216; otherwise, control transfers to 1220. At 1216, node servers that perform the identified task and that have an SU less than the average SU are selected. At 1224, if any node servers have been selected, control transfers to 1228; otherwise, control transfers to 1220. At 1228, control splits the identified task between the node server with the maximum SU and the selected node servers. Control then continues at 1232.

This split does not need to be even between all the servers and instead may be done proportionally to the available storage and/or processing. When splitting based on SU, control may attempt to achieve approximately equal SU between the original server and the newly assigned servers. Similarly, when splitting based on PU, control may attempt to achieve an approximately equal PU between the original server and the newly assigned servers.

Returning to 1220, control splits the identified task between the node server with the maximum SU and the node server with the lowest SU. Control then continues at 1232. At 1232, control moves data between the node servers corresponding to the task split and continues at 1236. At 1236, the task assignment information is updated for all servers and control ends.

Returning to 1208, the PU is more imbalanced than the SU and therefore, for the node server with the maximum PU, the task contributing the most to the PU is identified. Control continues at 1240, where control determines whether other node servers perform the identified task. If so, control transfers to 1244; otherwise, control transfers to 1248. At 1244, control selects node servers that perform the identified task and have a PU less than the average PU. At 1252, if any node servers have been selected, control transfers to 1256; otherwise, control transfers to 1248.

At 1248, control splits the identified task between the node server with the maximum PU and the selected node servers and continues at 1260. At 1248, control splits the identified task between the node server with the maximum PU and the node server with the lowest PU and continues at 1260. At 1260, data corresponding to the task is moved to the appropriate servers based on the split performed. Control then continues at 1236.

Figure 6D:
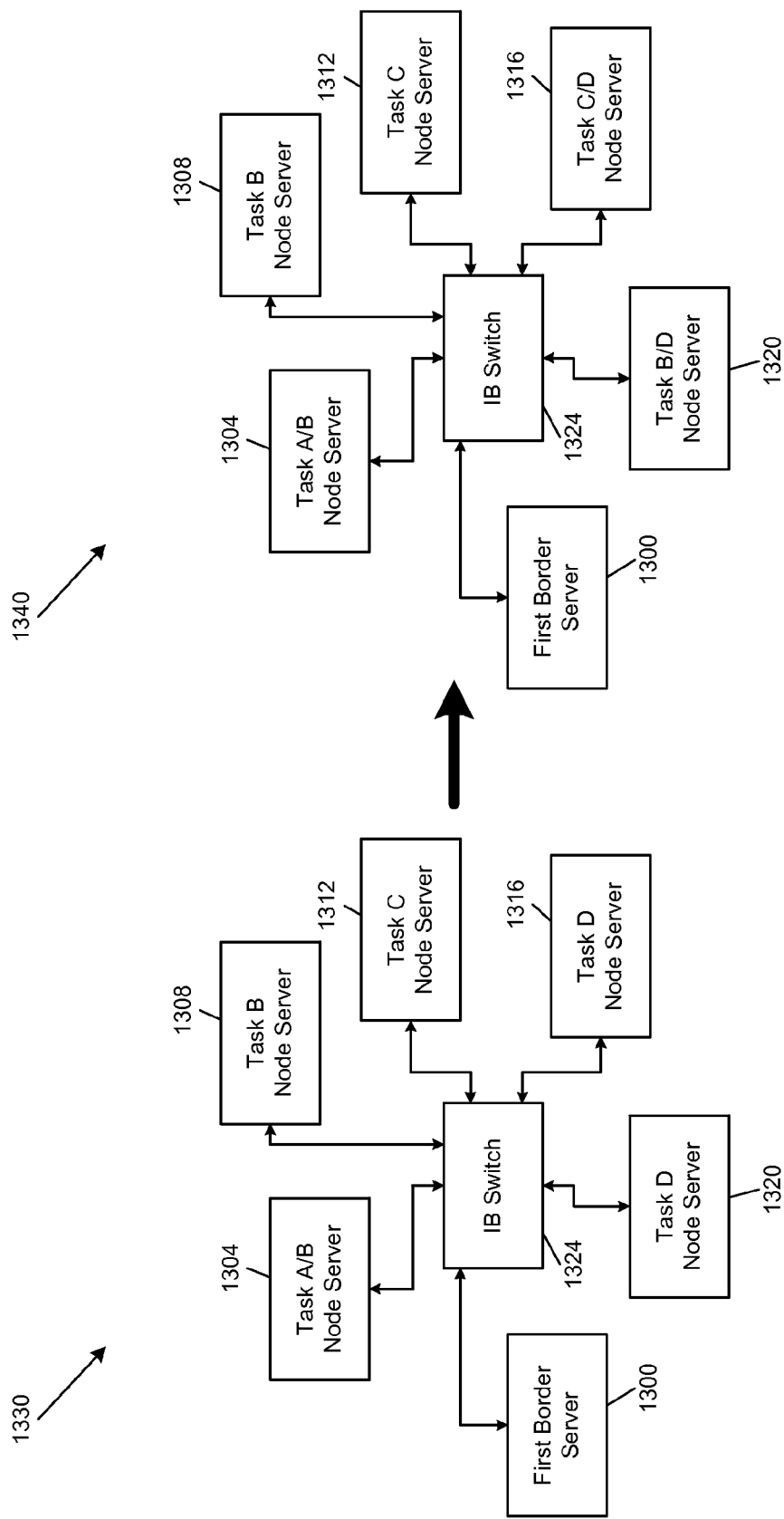
FIG. 6D is a high level flowchart depicting task assignment before and after an example rebalancing.

In FIG. 6D, a border server 1300 communicates with node servers 1304, 1308, 1312, 1316, and 1320 via an INFINIBAND® protocol communication network switch 1324. In a first arrangement 1330, the node server 1304 performs tasks A and B. Meanwhile, the node server 1308 performs task B, the node server 1312 performs task C, the node server 1316 performs task D, and the node server 1320 also performs task D. After rebalancing, a configuration as shown at 1340 may result.

The node server 1304 still performs tasks A and B, the node server 1308 still performs task B, and the node server 1312 still performs task C. The node server 1316 now performs task C in addition to task D. The node server 1320 also performs task B in addition to task D. As a result, the node server 1308 is only performing task B with respect to a subset of data. Similarly, the node server 1312 is performing task C based on a subset of data. The remaining data is acted upon for task C by the node server 1316, while the remaining data for task B is operated on by the node server 1320.

Figure 7:
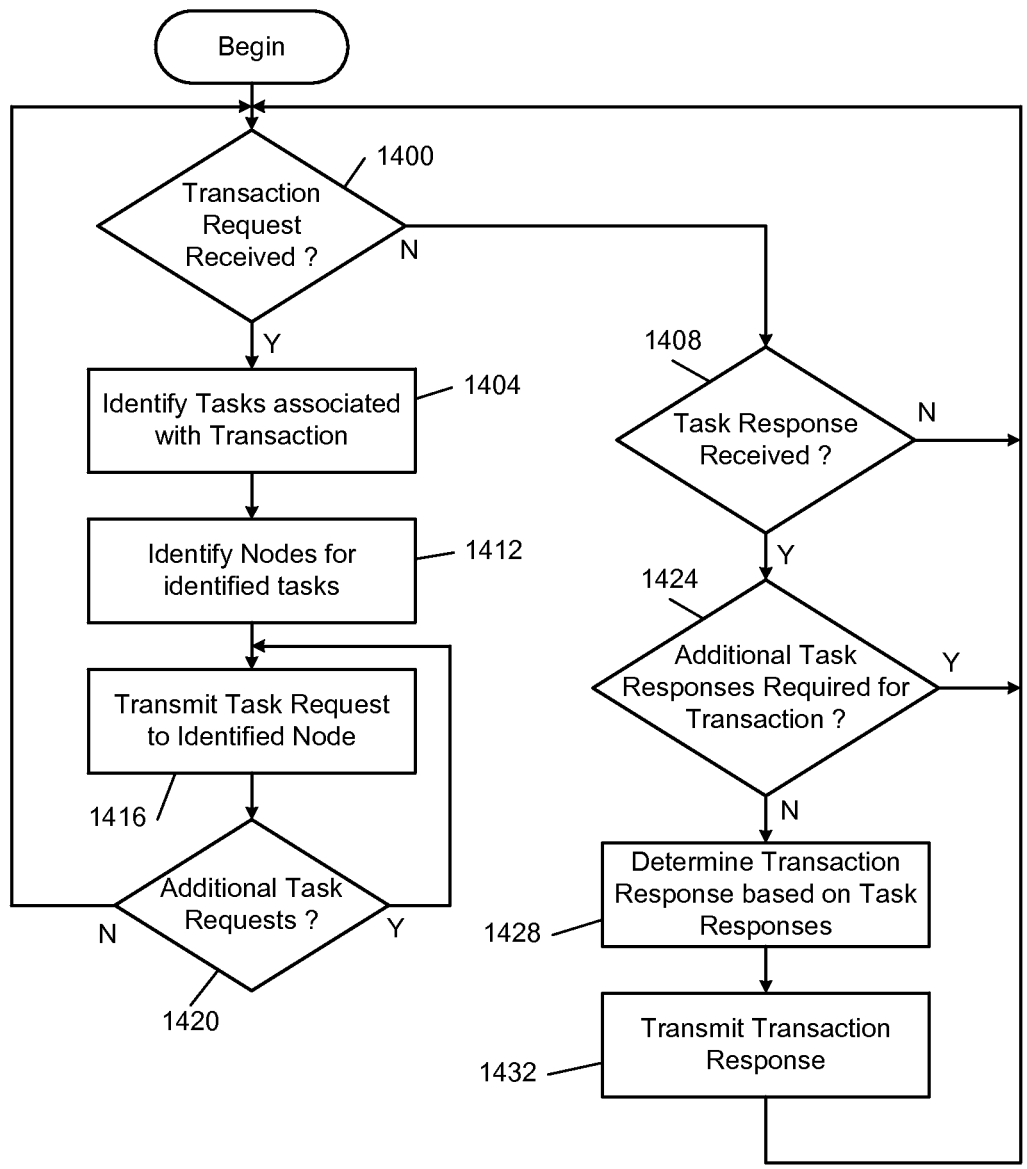
FIG. 7 is a flowchart of example operation of a border server.

In FIG. 7, example border server functionality is shown. Control begins at 1400, where if a transaction request is received, control transfers to 1404; otherwise, control transfers to 1408. At 1404, control identifies tasks associated with the transaction and at 1412 control identifies nodes to execute the identified tasks. At 1416, control transmits a task request to an identified node. At 1420, if there are additional task request, control returns to 1416; otherwise, control returns to 1400.

At 1408, if a task response has been received, control transfers to 1424; otherwise, control returns to 1400. At 1424, control determines whether additional task responses need to be received before the transaction is complete. If so, control returns to 1400; otherwise, control transfers to 1428. At 1428, control determines an appropriate response to the transaction based on the received task responses. At 1432, control transmits the transaction response to the requestor and returns to 1400.

Figure 8A:
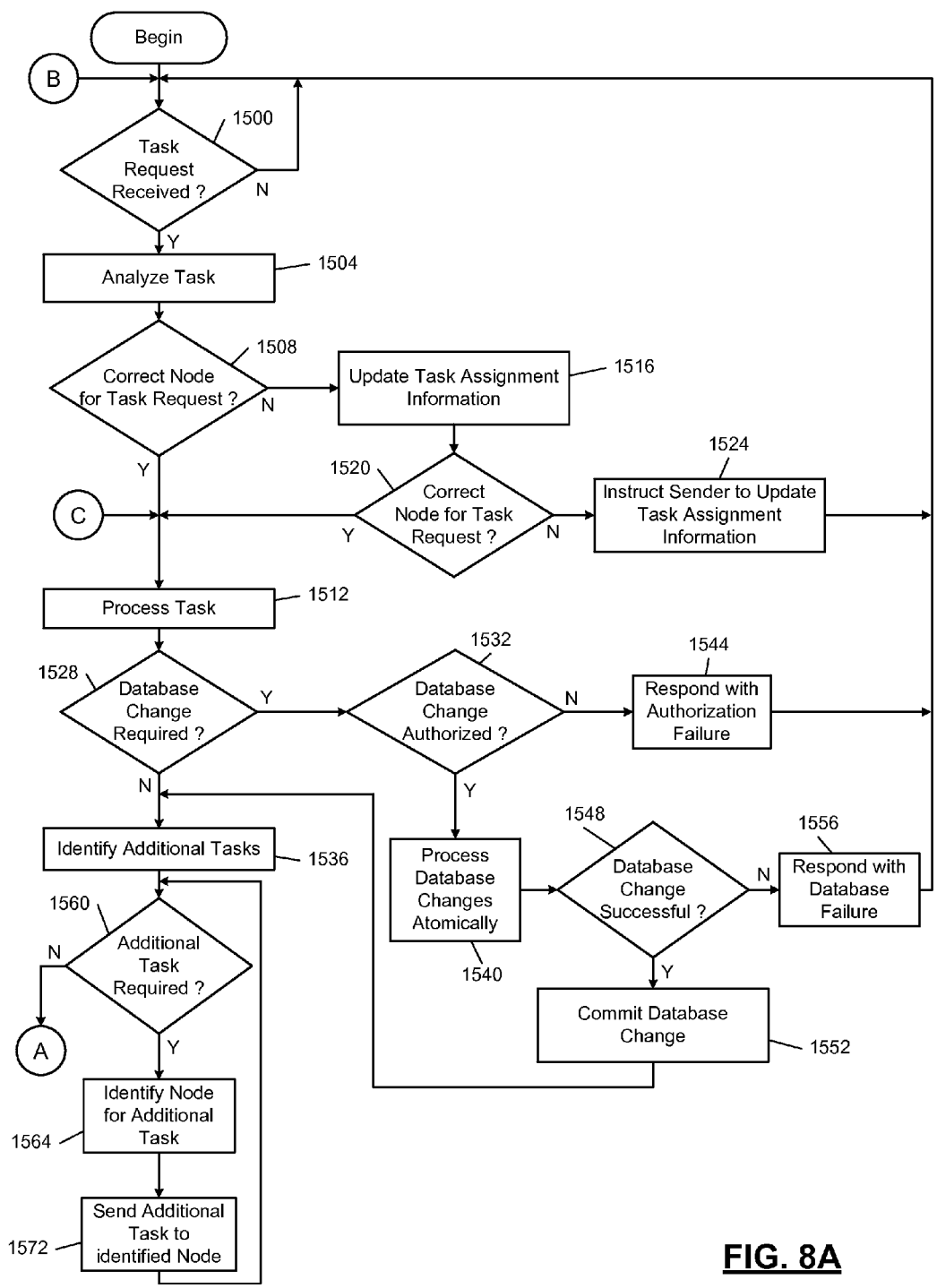
FIGS. 8A and 8B together are a flowchart of example operation of one of the node servers.

In FIG. 8A, control for a node server begins at 1500. If a task request is received, control transfers to 1504; otherwise, control remains at 1500. At 1504, the task is analyzed and at 1508, if the current node is the correct node for that task request based on both the task itself and the necessary data corresponding to the task request, control transfers to 1512; otherwise, control transfers to 1516.

At 1516, the node has received an incorrect task request, which may be an indication that the node needs updated task assignment information. Therefore the task assignment information is updated and control transfers to 1520 where, if based on the updated task assignment information, this is the correct node for the task request, control continues at 1512; otherwise, control transfers to 1524. At 1524, control instructs the sending server to update its task assignment information so that the task can be routed to the appropriate server. Control then returns to 1500.

At 1512, control processes the task and at 1528, if a database change is required, control transfers to 1532; otherwise, control transfers to 1536. At 1536, control determines whether the database change is authorized. If so, control transfers to 1540; otherwise, control transfers to 1544. At 1544, control responds to the task request with an authorization failure and control returns to 1500.

At 1540, the database change is authorized and therefore the database changes are processed atomically so that the entire database change either succeeds or fails and if the change fails, the database is left in an unchanged state. Control continues at 1548, where if the database change was successful, control transfers to 1552; otherwise, control transfers to 1556. At 1556, control responds with a database failure and returns to 1500. At 1552, control commits the database change and continues at 1536.

Figure 8B:
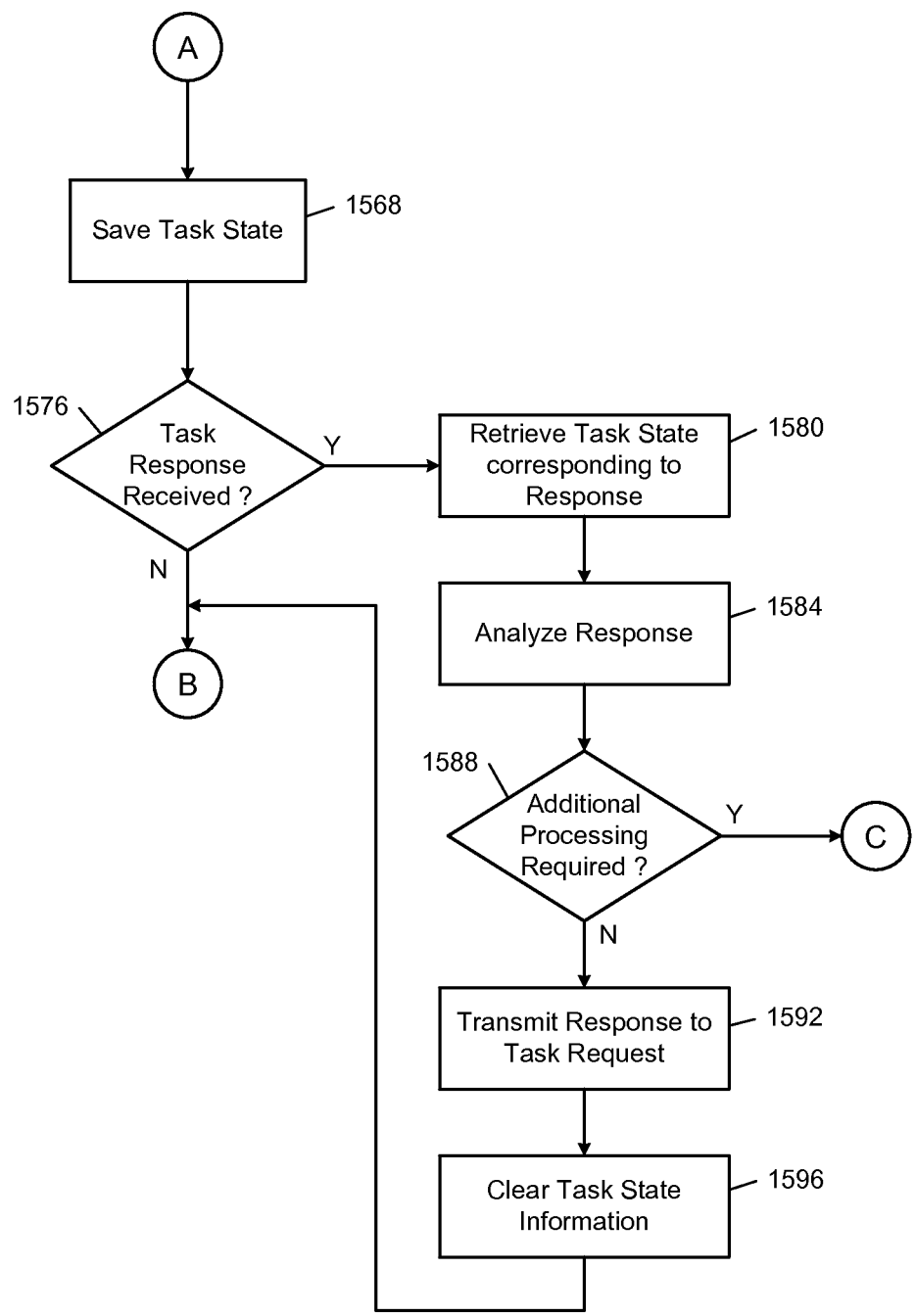

At 1536, control identifies whether any additional tasks need to be performed. If so, at 1560, control transfers to 1564; otherwise, control transfers to 1568 (see FIG. 8B, labeled with an encircled A). At 1564, control identifies a node to execute the additional task and at 1572, control sends a request for the additional task to the identified node. Control then returns to 1560. At 1568 (see FIG. 8B), task state is saved so that the server can proceed with processing other tasks while waiting for responses to subtasks. Control continues at 1576, where if a task is received, control transfers to 1580; otherwise, control returns to 1500 (see FIG. 8A).

At 1580, control retrieves the task state corresponding to the received response and at 1584, control analyzes the response. At 1588, control determines whether additional processing is required. If so, control transfers to 1512 (see FIG. 8A); otherwise, control transfers to 1592. At 1592, control transmits a response to the task request based on the received subtask responses. At 1596, control clears the task state information because the task is finished and returns to 1500.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

The invention claimed is:
1. A system comprising:
a plurality of servers that each include a processor and memory; and
a border server that includes a processor and memory and is configured to:

receive a request for a transaction, wherein the transaction can be accomplished by performing a plurality of tasks, identify a first task of the plurality of tasks, identify an initial server of the plurality of servers to perform the first task by consulting, based on a type of the first task, routing data stored in the memory of the border server, and request that the initial server perform the first task, wherein each server of the plurality of servers is configured to, in response to receiving a request for a task from the border server, perform the received task using data related to the received task, wherein the data related to the received task is stored exclusively on the server and is absent from each other server of the plurality of servers, determine whether the received task requires an additional task, identify a next server of the plurality of servers to perform the additional task by consulting, based on a type of the additional task, routing data stored in the memory of the server, request that the next server perform the additional task, and in response to receiving a completion indication from the next server, respond to the border server with a completion indication corresponding to the received task, wherein each server of the plurality of servers is configured to, in response to receiving a request for an additional task from a first server of the plurality of servers, perform the additional task using data related to the additional task, wherein the data related to the additional task is stored exclusively on the server and is absent from each other server of the plurality of servers, determine whether the additional task requires a further task, identify a further server of the plurality of servers to perform the further task by consulting, based on a type of the further task, routing data stored in the memory of the server, request that the further server perform the further task, and in response to receiving a completion indication from the further server, respond to the first server with a completion indication corresponding to the additional task, wherein:

the plurality of servers collectively performs a plurality of types of tasks, the initial server is configured to perform a first type of task of the plurality of types of tasks, and in response to over-utilization of the initial server (i) a second server of the plurality of servers is dynamically configured to also perform the first type of task, (ii) data related to the first type of task stored by the initial server is split into a first set of data and a second set of data, (iii) the first set of data is mutually exclusive with the second set of data, and (iv) the second set of data is moved from the initial server to the second server.

2. The system of claim 1, further comprising a networking switch configured to interconnect the plurality of servers with each other and with the border server.

3. The system of claim 2, wherein the border server (i) includes a first network port in communication with the networking switch and a second network port not in communication with the networking switch and (ii) receives the request for the transaction over the second network port.

4. The system of claim 3, wherein the border server is configured to receive the transaction request over the Internet through a web service.

5. The system of claim 3, wherein the border server is configured to receive the transaction request from a web server.

6. The system of claim 5, further comprising the web server, wherein the web server serves a web page to a user and prepares the transaction request based on input provided by the user via the web page.

7. The system of claim 2, wherein the networking switch supports remote direct memory access (RDMA).

8. The system of claim 2, wherein the initial server and the next server are configured such that data is selectively transferred from the memory of the initial server to the memory of the next server via the networking switch without involvement of the processor of the initial server or the processor of the next server.

9. The system of claim 8, wherein the plurality of servers each implement remote direct memory access (RDMA).

10. The system of claim 1, further comprising a mirror server that stores a copy of data stored by a designated server of the plurality of servers, wherein the mirror server is configured to execute tasks in place of the designated server in response to a failure of the designated server.

11. The system of claim 1, wherein:

the next server is configured to perform a second type of task of the plurality of types of tasks.

12. The system of claim 11, wherein:

a third server of the plurality of servers is configured to perform the second type of task, a fourth server of the plurality of servers is also configured to perform the second type of task, the third server stores a first set of second-task data related to the second type of task, the fourth server stores a second set of second-task data related to the second type of task, and the first set of second-task data is mutually exclusive with the second set of second-task data.

13. The system of claim 12, wherein:

the routing data specifies the third server as the next server in response to the additional task corresponding to the first set of second-task data, and the routing data specifies the fourth server as the next server in response to the additional task corresponding to the second set of second-task data.

14. The system of claim 12, wherein the third server and the fourth server are configured to dynamically move data from the first set of second-task data into the second set of second-task data in response to over-utilization of the third server.

15. A system comprising:

a plurality of servers each including a processor and memory, wherein a first server of the plurality of servers is configured to receive a request for a transaction, wherein the transaction can be accomplished by performing a plurality of tasks, select a first task of the plurality of tasks, identify a second server of the plurality of servers to perform the first task by consulting, based on a type of the first task, routing data stored in the memory of the first server, and request that the second server perform the first task, wherein the second server is configured to, in response to receiving the request for the first task,
  perform the first task using data specific to the first task, wherein the data specific to the first task is stored on the second server to the exclusion of all other ones of the plurality of servers,
  determine whether the first task requires an additional task, and
  in response to the first task requiring an additional task,
    identify a third server of the plurality of servers to perform the additional task by consulting, based on a type of the additional task, routing data stored in the memory of the second server,
    request that the third server perform the additional task, and
    in response to receiving a completion indication from the third server, respond to the first server with a completion indication corresponding to the first task,
wherein each additional server of the plurality of servers is configured to, in response to receiving a request for a principal task at the additional server,
  perform the principal task using data specific to the principal task, wherein the data specific to the principal task is stored on the additional server to the exclusion of all other ones of the plurality of servers,
  determine whether the principal task requires a sub-task, and
  in response to the principal task requiring a sub-task,
    select a particular server of the plurality of servers to perform the sub-task by consulting, based on a type of the additional task, routing data stored in the memory of the additional server,
    request that the particular server perform the sub-task, and
    in response to receiving a completion indication from the particular server, respond to a source of the principal task with a completion indication identifying the principal task,
wherein:
  the plurality of servers is collectively configured to perform a plurality of types of tasks,
  the first server is configured to perform a first type of task of the plurality of types of tasks, and
  in response to over-utilization of the first server,
    (i) another server of the plurality of servers is dynamically configured to also perform the first type of task,
    (ii) data related to the first type of task stored by the first server is split into a first set of data and a second set of data,
    (iii) the first set of data is mutually exclusive with the second set of data,
    (iv) the second set of data is moved from the first server to the another server, and
    (v) updating the routing data stored in the memory of the plurality of servers to (a) specify the first server as the particular server in response to the additional task corresponding to the first set of data and (b) specify the another server as the particular server in response to the additional task corresponding to the second set of data.

16. A method of operating a system including a border server and a plurality of servers, the border server including a processor and memory, and each of the plurality of servers including a processor and memory, the method comprising:
  at the border server, receiving a request for a transaction, wherein the transaction can be accomplished by performing a plurality of tasks;
  at the border server, identifying a first task of the plurality of tasks;
  at the border server, identifying an initial server of the plurality of servers to perform the first task by consulting, based on a type of the first task, routing data stored in the memory of the border server;
  at the border server, requesting that the initial server perform the first task; and
  at a server of the plurality of servers, in response to receiving a request for a task:
    performing the received task using data related to the received task, wherein the data related to the received task is stored on the server and absent from each other one of the plurality of servers;
    determining whether the received task requires an additional task;
    identifying a next server of the plurality of servers to perform the additional task by consulting, based on a type of the additional task, routing data stored in the memory of the server;
    recursively requesting that the next server perform the additional task; and
    in response to receiving a completion indication from the next server, responding to a source of the received task with a completion indication corresponding to the received task,
  wherein:
    the plurality of servers is collectively configured to perform a plurality of types of tasks,
    the initial server is configured to perform a first type of task of the plurality of types of tasks, and
    the method further comprises, in response to over-utilization of the initial server,
      (i) dynamically configuring a second server of the plurality of servers to also perform the first type of task,
      (ii) splitting data related to the first type of task stored by the initial server into a first set of data and a second set of data, wherein the first set of data is mutually exclusive with the second set of data, and
      (iii) moving the second set of data from the initial server to the second server.

17. The method of claim 16, further comprising receiving the transaction request, at the border server, over the Internet using a web service.

18. The method of claim 16, further comprising receiving the transaction request, at the border server, from a web server.

19. The method of claim 18, further comprising, at the web server, serving a web page to a user and preparing the transaction request based on input provided by the user via the web page.

20. The method of claim 16, further comprising selectively transferring data from the memory of the initial server to the memory of the next server without involvement of the processor of the initial server or the processor of the next server.

21. The method of claim 20, further comprising implementing remote direct memory access (RDMA) at each of the plurality of servers.

22. The method of claim 16, further comprising:
  at a mirror server, storing a copy of data stored by a designated server of the plurality of servers; and at the mirror server, executing tasks in place of the designated server in response to a failure of the designated server.

23. The method of claim 16, further comprising:
the next server, performing a second type of task of the plurality of types of tasks.

24. The method of claim 16, further comprising:
at a third server of the plurality of servers, performing the second type of task;
at the third server, storing a first set of second-task data related to the second type of task;
at a fourth server of the plurality of servers, performing the second type of task; and
at the fourth server, storing a second set of second-task data related to the second type of task,
wherein the first set of second-task data is mutually exclusive with the second set of second-task data.

25. The method of claim 24, wherein:
the routing data specifies the third server as the next server in response to the additional task corresponding to the first set of second-task data, and
the routing data specifies the fourth server as the next server in response to the additional task corresponding to the second set of second-task data.

26. The method of claim 24, further comprising dynamically moving data from the first set of second-task data into the second set of second-task data in response to over-utilization of the third server.

\* \* \* \* \*